UNITED STATES PATENT OFFICE.

ROBERT T. PAESSLER, OF WILKES-BARRE, PENNSYLVANIA.

SHORTENING COMPOSITION.

1,203,905.

Specification of Letters Patent.

Patented Nov. 7, 1916.

No Drawing.

Application filed March 15, 1916. Serial No. 84,399.

*To all whom it may concern:*

Be it known that I, ROBERT T. PAESSLER, a citizen of the United States of America, and resident of Wilkes-Barre, in the county of Luzerne and State of Pennsylvania, have invented certain new and useful Improvements in Shortening Compositions, of which the following is a specification.

This invention relates to shortening compositions and particularly to a composition which may be utilized in connection with any cereal flour or product used in baking, it having been found that it is effective when used in the production of bread, pastry or the like, where lard or lard substitutes are used.

The object of this invention is to provide a composition in which any edible oil may form the bulk or major portion, the same being treated so as to thicken it and render it useful for the purpose intended.

A further object of this invention is to produce a shortening at a very low cost as compared with shortenings now in common use having the characteristics in so far as its action on the grain products is concerned of lard or lard substitutes, the same being maintained in its natural state and flavor throughout a long period of time, thus insuring against its becoming rancid or otherwise impaired for its intended use, and tending to easily and intimately mix with the products in which it is to be used, due to its emulsified condition.

In carrying out the invention, I take an oil, preferably corn oil, cotton seed oil or any other edible oil and mix the same with stearic acid or its equivalent and subject the mixed oil and acid to the action of heat, adding thereto sodium hydrate or its equivalent dissolved in water, the commingled ingredients being agitated to emulsify them and bring them to the proper consistency.

While I have to some degree of definiteness specified the ingredients, it is possible to utilize ingredients other than those mentioned to cause the saponification of the acid or oil to a degree to render it plastic without producing any deleterious effect in so far as its use is concerned as an ingredient of an article of food. For example, any fatty acid which will saponify may be employed as a substitute for stearic acid or the saponification may be effected directly on the oil itself, and any substance of an alkaline nature which is harmless in food products and is capable of saponifying the fatty acid or oil, may be employed.

Another method by which the invention can be carried into practice is to employ ammonium hydrate or ammonium carbonate or its equivalent, mixed or dissolved in water and added to the oil and stearic acid. The emulsion formed when mixed with the cereal or cereal substitute in baking will wholly or partially break up and liberate wholly or in part free stearic acid or the acid of the ingredient substituted for the stearic acid and gaseous ammonia will also be liberated to effectually aid in leavening the mass being baked. When ammonium hydrate or the equivalent is employed, the ingredients should be mixed so that the oil is emulsified at the lowest possible temperature, as it is desirable to prevent the liberation of the ammonia gases prior to the time the mass being baked is subjected to heat.

As an example of a means for producing the desired result and for the purpose of disclosing one embodiment of the invention, a disclosure of one of the best known methods for carrying out the process and producing the shortening is here stated as follows: The ingredients and the approximate proportions of each ingredient are as follows: corn oil 63 parts by weight, stearic acid 6 parts by weight, sodium hydrate (78 per cent.) 1 1/10 parts by weight, water 30 parts by weight.

In carrying out the process the oil and acid are combined and mixed. The combined oil and acid is heated to approximately 150° F. and retained at that temperature until the stearic acid is dissolved in the oil. Meanwhile, sodium hydrate is dissolved in water, the last mentioned mixture being heated to approximately the temperature of the oil and stearic acid. The aqueous solution thus produced is slowly added to the heated oil and acid while the said oil and acid is being agitated or stirred and the agitation is continued or maintained until a homogeneous product is obtained. When ammonia is substituted for the sodium hydrate, the process of mixing is practically the same as outlined in the preceding paragraph except that the corn oil and stearic acid is maintained at a lower temperature than indicated above while the ammonium hydrate or its equivalent is being added. The resultant product may then be employed as a shortening just as lard and lard substitutes are used in baking or cooking, when the same is mixed with grain flour, starchy materials, or other materials employed as a substitute for flour or starchy materials in the baking processes.

While I have referred to the addition of a solution of sodium hydrate or its equivalent to the mixture of oil and acid, or the oil itself, it is understood that the saponified material depended upon to emulsify or thicken the oil, may be added in a dry state to the oil.

I claim—

1. The herein described shortening consisting of an edible oil held in an emulsified state by a saponified agent.

2. A process of producing shortening consisting in mixing an edible oil with a substance having an alkaline reaction, and water.

3. A process for producing shortening consisting in mixing an edible oil with a substance having an alkaline reaction.

4. The herein described shortening consisting of an edible oil held in an emulsified state by an aqueous mixture of a saponified ingredient having an ammonia base.

5. The herein described shortening consisting of an edible oil and a saponified ingredient having an ammonia base.

6. A process of producing shortening consisting in mixing an edible oil, a fatty acid, a substance having an alkaline reaction, and water.

7. A process of producing shortening consisting of mixing 63 parts corn oil, 6 parts stearic acid, one and one-tenth parts of seventy-eight per cent. sodium hydrate, and thirty parts water.

8. A process for producing shortening consisting in mixing an edible oil, a fatty acid and heating the same to a temperature of approximately 150° F., and adding an aqueous solution comprising a substance having an alkaline reaction dissolved in water heated to approximately the temperature of the oil, while the materials are being agitated, to produce a homogeneous product.

9. A process for producing shortening consisting in mixing edible oil and fatty acid and heating the same to a temperature of approximately 150° F., and adding an aqueous solution of a substance in quantities sufficient to saponify the added fatty acid.

10. A process for producing shortening consisting in mixing an edible oil, and sufficient fatty acid to produce the desired consistency of the shortening when said fatty acid is saponified and sufficient material of an alkaline reaction dissolved in water to completely saponify the fatty acid.

11. A process of producing shortening consisting in mixing an edible oil, a fatty acid, and a substance having an alkaline reaction.

In testimony whereof, I affix my signature in the presence of two witnesses.

ROBERT T. PAESSLER.

Witnesses:
  Margaret I. Pfeifer,
  Alice G. Brown.